Patented Dec. 12, 1933

1,939,236

UNITED STATES PATENT OFFICE 1,939,236

AMYLACEOUS PRODUCTS AND METHOD OF PREPARING THE SAME

William E. Stokes, Brooklyn, N. Y., assignor to Royal Baking Powder Company, New York, N. Y., a corporation of New Jersey No Drawing. Application December 5, 1930
Serial No. 500,415

10 Claims. (Cl. 127—32)

This invention relates to starch products and to processes of manufacturing the same, and has as a general object the production of novel starch products having improved properties, by a novel process and in an efficient and economical manner.

A more particular object of the invention is to provide a method of treating starch, either as such or in materials containing the same, by first cooking the starch, or the material containing the same, under controlled conditions of time and temperature, and thereafter freezing the mass; whereby the starch granules are disrupted and the product has improved characteristics.

A specific object of the invention is to provide a process of treating starch to produce a product which may be readily dried to produce a product having a soft fibrous structure which will readily take up hot water to form a paste that has a thoroughly cooked taste and which, when cooled, will set and can be molded; said dried product being adapted to be readily ground to produce a soft fluffy starchy material which has improved water absorption and other desirable characteristics, that render it suitable for a variety of important and novel uses.

Other objects of the invention will in part be obvious and will in part appear hereinafter.

The invention accordingly comprises the several steps and the relation and order of such steps with respect to each other, and the product possesses the features and properties which are exemplified in the following detailed disclosure, and the scope of the application of which will be indicated in the claims.

Generally stated, the process in its preferred embodiment consists in preparing a starch paste containing from 5%–25% of starch by weight on a dry basis, by cooking the starch with an aqueous liquid such as water at a temperature sufficient, but not materially exceeding, that necessary to disrupt the starch granules and for a time sufficient to effect this result, but so limited so as to minimize the dextrinization of the starch; thereafter cooling the mixture and freezing the same; and then, if desired, allowing the frozen mass to thaw; separating the water from the starch; drying the starch; and grinding the dried starch to a powder.

Although, as will be readily understood by one skilled in the art, the exact temperature to which the starch should be cooked will vary in accordance with the particular type of starch being treated and the product desired, in general, the preferred temperature range has been found to be between 60°–80° C., and for most starches preferably from 65°–72° C., the cooking being carried on with constant stirring for a short period, say about five minutes, in order to obtain a product which will set when subsequently admixed with hot water and cooled. The cooked mass should then preferably be quickly cooled and subjected to the freezing step. This step may be carried on at various temperatures, but it has been found to be unnecessary to carry it out at a temperature below 0° C.

By way of further exemplification, but not in limitation of the process, the following specific example is given:

About 10 parts of corn starch are mixed with 100 parts of water, and the mixture is then heated to 72° C. with stirring to insure uniform heating at this temperature for a period of about five minutes. The starch paste thus formed is then cooled and is frozen at about 0° C., whereupon the frozen mixture is thawed, the water removed by pressing or centifuging, the separated starch is dried, and the dried starch is ground to pass through a 200-mesh sieve; the word "dried" being used herein to indicate that the material is sensibly, although not necessarily absolutely, dry.

It is to be noted that the dried starch material, prior to grinding, has a soft and fibrous structure, and the product produced in accordance with the principles of the present invention, either with or without previous drying, may be readily taken up with hot water without extended cooking to produce a smooth starch pudding which will set and can be molded; and, as a result, the product is particularly adapted for use in the preparation of puddings without extended cooking operations, and is also useful as an addition to cake flours to increase the water absorption, and may be used in the preparation of gum drops, Turkish paste, and in ice cream, in place of gelatin and/or gums.

Arrow root starch may be cooked in the same manner and at the same temperature as the corn starch mentioned in the above example, but as a general rule, other starches, or substances containing the same, should be cooked at a somewhat lower temperature in order to avoid destroying the setting properties when subsequently made into puddings.

It is also to be noted that the principles of the present invention can be applied to raw starch in its manufacture to eliminate the impurities therefrom, and facilitate drying thereof; or to amylaceous substances such as hominy grits, corn meal, oat meal and the like, or to starch-containing products such as cocoa to minimize the tendency toward settling out when a beverage is prepared therefrom; and the word "starch" is used herein in a broad sense. In certain cases the starch material treated as hereinabove described may be subsequently toasted to form a delicious pre-cooked breakfast food.

Particularizing somewhat further as to the novel product produced by the present improved process, it might be pointed out that whereas common starch has very low water absorption, probably not more than 25% with cold water, the improved product has a very high water absorption with cold water, approximating 100%; and that whereas common starch does not swell to any extent when cold water is added, the starch prepared by the present process swells to at least ten times or more its original volume.

It will thus be seen that by means of the principles of the present invention, there has been provided an improved process, producing improved products having very desirable and novel characteristics, and since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover the generic and specific features of the invention herein described, and all statements of the scope of the invention which, as a matter of language, might be said to fall therebetween.

Having described my invention, what I claim as new and desire to secure by Letters Patent, is:

1. A process of treating starch which comprises heating the starch with water to a temperature and for a time sufficient to disrupt the starch granules without substantial dextrinization of the starch, and thereafter freezing the mass.

2. A process of treating starch which comprises heating the starch with water to a temperature and for a time sufficient to disrupt the starch granules without substantial dextrinization of the starch, thereafter freezing the mass, allowing the mass to thaw, and separating the water from the starch.

3. A process of treating starch which comprises heating the starch with water to a temperature and for a time sufficient to disrupt the starch granules without substantial dextrinization of the starch, thereafter freezing the mass, allowing the mass to thaw, separating the water from the starch as by centrifuging, and thereafter drying the starch.

4. A process of treating starch which comprises heating the starch with water to a temperature and for a time sufficient to disrupt the starch granules without substantial dextrinization of the starch, thereafter freezing the mass, allowing the mass to thaw, separating the water from the starch as by centrifuging, and thereafter drying and grinding the starch to a powder passing, for example, a 200-mesh sieve.

5. A process of treating starch which comprises preparing a starch paste containing from 5%–25% of starch by weight on a dry basis, by cooking the starch with water to a temperature of 60°–80° C. for a period of about five minutes, thereafter freezing the mass at about 0° C., allowing the mass to thaw, and separating the water from the starch.

6. A process of treating corn starch which comprises preparing a starch paste containing from 5%–25% of starch by weight on a dry basis, by cooking the starch with water to a temperature of about 72° C. for a period of about five minutes, thereafter freezing the mass at about 0° C., allowing the mass to thaw, and separating the water from the starch.

7. A process of manufacturing pre-cooked cereal products which comprises cooking an amylaceous material with an aqueous liquid to disrupt the starch granules, then freezing the mass, allowing it to thaw, separating the excess water, and subsequently toasting the solid material.

8. As a new composition of matter, a starch product comprising a toasted product prepared from a dry, starchy material in which the starch granules are substantially, completely disrupted, are of a soft, fibrous structure, which will take up water to form a paste that will set and can be molded, which has a water absorption of approximately 100% with cold water, and when admixed therewith swells to approximately ten times its original volume.

9. As a composition of matter, a starch product comprising dry starchy material in which the starch granules are substantially completely disrupted, having a soft, fibrous structure, a water absorption of approximately 100% in cold water, which swells to approximately ten times its original volume when admixed with cold water, and which may be taken up with hot water to form a paste that will set and can be molded when cooled.

10. As a new composition of matter, a starch product comprising dry starchy material, passing a 200 mesh sieve and in which the starch granules are substantially completely disrupted, having a soft, fluffy consistency, a water absorption of approximately 100% in cold water, which swells to approximately ten times its original volume when admixed with cold water, and which may be taken up with hot water to form a paste that will set and can be molded when cooled.

WILLIAM E. STOKES.